United States Patent
Anderson et al.

(10) Patent No.: US 10,933,711 B2
(45) Date of Patent: Mar. 2, 2021

(54) SUSPENSION SENSOR

(71) Applicant: Ford Global Technologies, LLC, Dearborn, MI (US)

(72) Inventors: Edmund Scott Anderson, Canton, MI (US); Russ Lee Norton, Brownstown Township, MI (US); David John Rutkowski, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 16/361,735

(22) Filed: Mar. 22, 2019

(65) Prior Publication Data

US 2020/0298646 A1 Sep. 24, 2020

(51) Int. Cl.
| | | |
|---|---|---|
| *B60G 17/019* | (2006.01) | |
| *G01L 1/22* | (2006.01) | |
| *B60Q 1/04* | (2006.01) | |
| *B60G 7/00* | (2006.01) | |

(52) U.S. Cl.
CPC .......... *B60G 17/019* (2013.01); *G01L 1/2287* (2013.01); *B60G 7/001* (2013.01); *B60G 2204/1162* (2013.01); *B60G 2401/26* (2013.01); *B60Q 1/04* (2013.01)

(58) Field of Classification Search
CPC ....................... B60G 2204/1162; B60G 17/019
See application file for complete search history.

(56) References Cited

U.S. PATENT DOCUMENTS

| | | | | |
|---|---|---|---|---|
| 4,838,563 | A | * | 6/1989 | Konishi ............... B60G 17/019 180/41 |
| 5,157,372 | A | | 10/1992 | Langford |
| 5,309,135 | A | | 5/1994 | Langford |
| 5,461,564 | A | * | 10/1995 | Collins ............ B60G 17/01933 280/5.514 |
| 5,497,081 | A | * | 3/1996 | Wolf ........................ G01D 3/02 324/207.12 |
| 6,231,216 | B1 | | 5/2001 | Frasch |
| 6,234,654 | B1 | * | 5/2001 | Okuchi ..................... B60Q 1/10 362/276 |
| 6,445,178 | B1 | * | 9/2002 | Hoekstra .......... B60G 17/01933 324/202 |
| 6,566,864 | B1 | * | 5/2003 | Brown .............. B29C 45/14754 280/6.15 |
| 9,352,629 | B2 | | 5/2016 | Chabanon et al. |

(Continued)

FOREIGN PATENT DOCUMENTS

| | | |
|---|---|---|
| JP | 2007022418 A | 2/2007 |
| WO | 9424534 A1 | 10/1994 |

(Continued)

*Primary Examiner* — James A English
(74) *Attorney, Agent, or Firm* — Ray Coppiellie; Bejin Bieneman PLC

(57) ABSTRACT

A suspension system includes a vehicle frame component, a suspension component coupled to and movable relative to the vehicle frame component, a flexible sensor, and a rotatable joint. The flexible sensor is elongated between a first end and a second end, and the first end of the flexible sensor is fixed relative to one of the vehicle frame component or the suspension component. The rotatable joint couples the second end of the flexible sensor to the other of the vehicle frame component or the suspension component.

18 Claims, 5 Drawing Sheets

(56) References Cited

U.S. PATENT DOCUMENTS

| | | | |
|---|---|---|---|
| 9,452,657 B1* | 9/2016 | Giaier | B60Q 1/08 |
| 9,688,113 B2* | 6/2017 | Ruppert | A01M 7/0053 |
| 2003/0019323 A1* | 1/2003 | Babin | F16C 7/02 |
| | | | 74/579 R |
| 2018/0251000 A1* | 9/2018 | Norton | G01B 7/14 |

FOREIGN PATENT DOCUMENTS

| | | | | |
|---|---|---|---|---|
| WO | WO-9424534 A1 * | 10/1994 | ......... | G01D 5/35377 |
| WO | 9429671 A1 | 12/1994 | | |

* cited by examiner

SUSPENSION SENSOR

BACKGROUND

Vehicles include suspension systems. Suspension systems couple wheels to frames of the vehicles, allow vertical motion of the wheels relative to the frames, and absorb and dampen shocks and vibrations from the wheels to the frames. Suspension systems can be dependent, in which the change in position of a wheel affects the position of the wheel on the opposite side of the vehicle, or independent, in which each wheel can move without affecting the other wheels. Types of dependent suspension systems include Satchell link, Panhard rod, Watt's linkage, Mumford linkage, and leaf springs. Types of independent suspensions include swing axle, sliding pillar, MacPherson strut, double wishbone, multilink suspension, semi-trailing arm suspension, and swinging arm.

DETAILED DESCRIPTION

Figure 1:
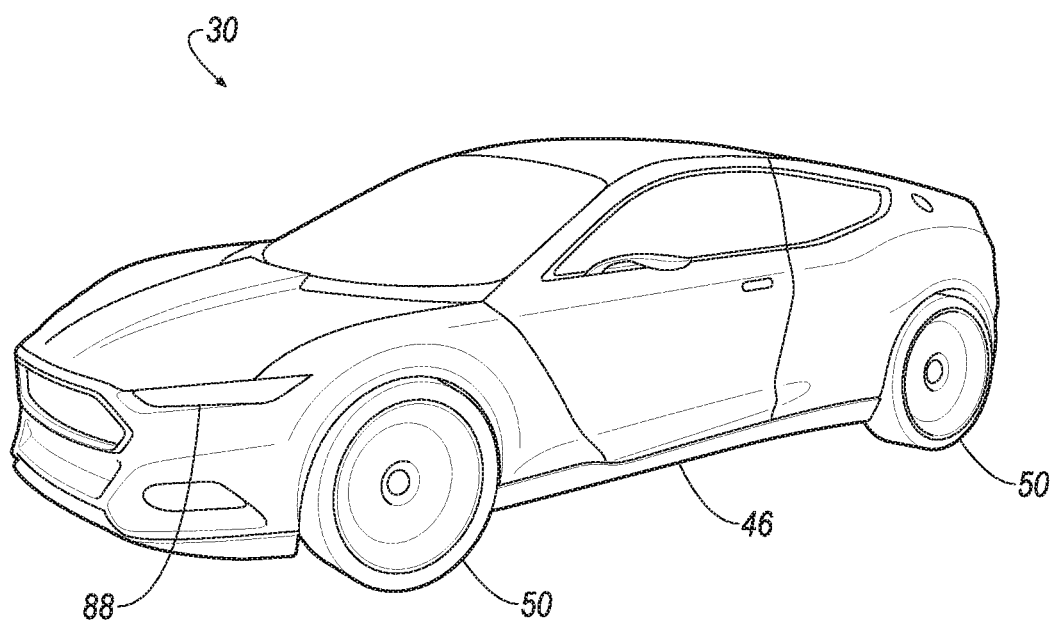
FIG. 1 is a perspective view of a vehicle.

A suspension system includes a vehicle frame component, a suspension component coupled to and movable relative to the vehicle frame component, a flexible sensor elongated between a first end and a second end, and a rotatable joint. The first end of the flexible sensor is fixed relative to one of the vehicle frame component or the suspension component. The rotatable joint couples the second end of the flexible sensor to the other of the vehicle frame component or the suspension component.

The rotatable joint may be connected to the flexible sensor at the second end of the flexible sensor, and the suspension system may further include a link arm elongated between a first end and a second end, and the first end of the link arm may be attached at the first rotatable joint, and the second end of the link arm may be coupled to the other of the vehicle frame component or the suspension component. The rotatable joint may be a first rotatable joint, and the suspension system may further include a second rotatable joint attached at the second end of the link arm and at the other of the vehicle frame component or the suspension component.

The second rotatable joint may be a ball joint.

The rotatable joint may be a ball joint.

The flexible sensor may be configured to provide output indicating a bending moment of the flexible sensor.

The suspension component may be rotatable relative to the vehicle frame component.

The suspension component may be one of an upper control arm or a lower control arm.

The first end of the flexible sensor may have a fixed position and orientation relative to the one of the vehicle frame component or the suspension component.

The second end of the flexible sensor may be rotatable relative to the other of the vehicle frame component or the suspension component.

The flexible sensor may be a potentiometer.

The flexible sensor may include a layer of conductive ink.

The suspension system may further include a shock absorber coupled to the vehicle frame component and to the suspension component.

The suspension system may further include a controller communicatively coupled to the flexible sensor and programmed to actuate a vehicle component based on data received from the flexible sensor. The vehicle component may be an active headlamp.

The vehicle component may be an active shock absorber coupled to the vehicle frame component and to the suspension component.

A suspension system 32 for a vehicle 30 includes a vehicle frame component 34, a suspension component 36 coupled to and movable relative to the vehicle frame component 34, a flexible sensor 38, and a first rotatable joint 40. The flexible sensor 38 is elongated between a first end 42 and a second end 44, and the first end 42 of the flexible sensor 38 is fixed relative to one of the vehicle frame component 34 or the suspension component 36. The first rotatable joint 40 couples the second end 44 of the flexible sensor 38 to the other of the vehicle frame component 34 or the suspension component 36.

The suspension system 32 provides a simple, efficient way to measure the vertical travel of wheels 50 of the suspension system 32. The suspension system 32 provides accurate measurements while using a small number of components, and the arrangement of components is robust over time.

With reference to FIG. 1, the vehicle 30 may be any passenger or commercial automobile such as a car, a truck, a sport utility vehicle, a crossover, a van, a minivan, a taxi, a bus, etc. The vehicle 30 may include a left side and a right side, divided from each other by a plane extending longitudinally and vertically through a middle of the vehicle 30. Components described below or shown in the Figures as being on the left side or right side may all be flipped to or duplicated on the opposite side.

The vehicle 30 includes a vehicle frame 46. The vehicle 30 may be of a unibody construction, in which the vehicle frame 46 and the body of the vehicle 30 are a single component, as shown in the Figures. The vehicle 30 may, alternatively, be of a body-on-frame construction, in which the vehicle frame 46 supports a body (not shown) that is a separate component from the vehicle frame 46. The vehicle frame 46 and body may be formed of any suitable material, for example, steel, aluminum, etc.

Figure 2:
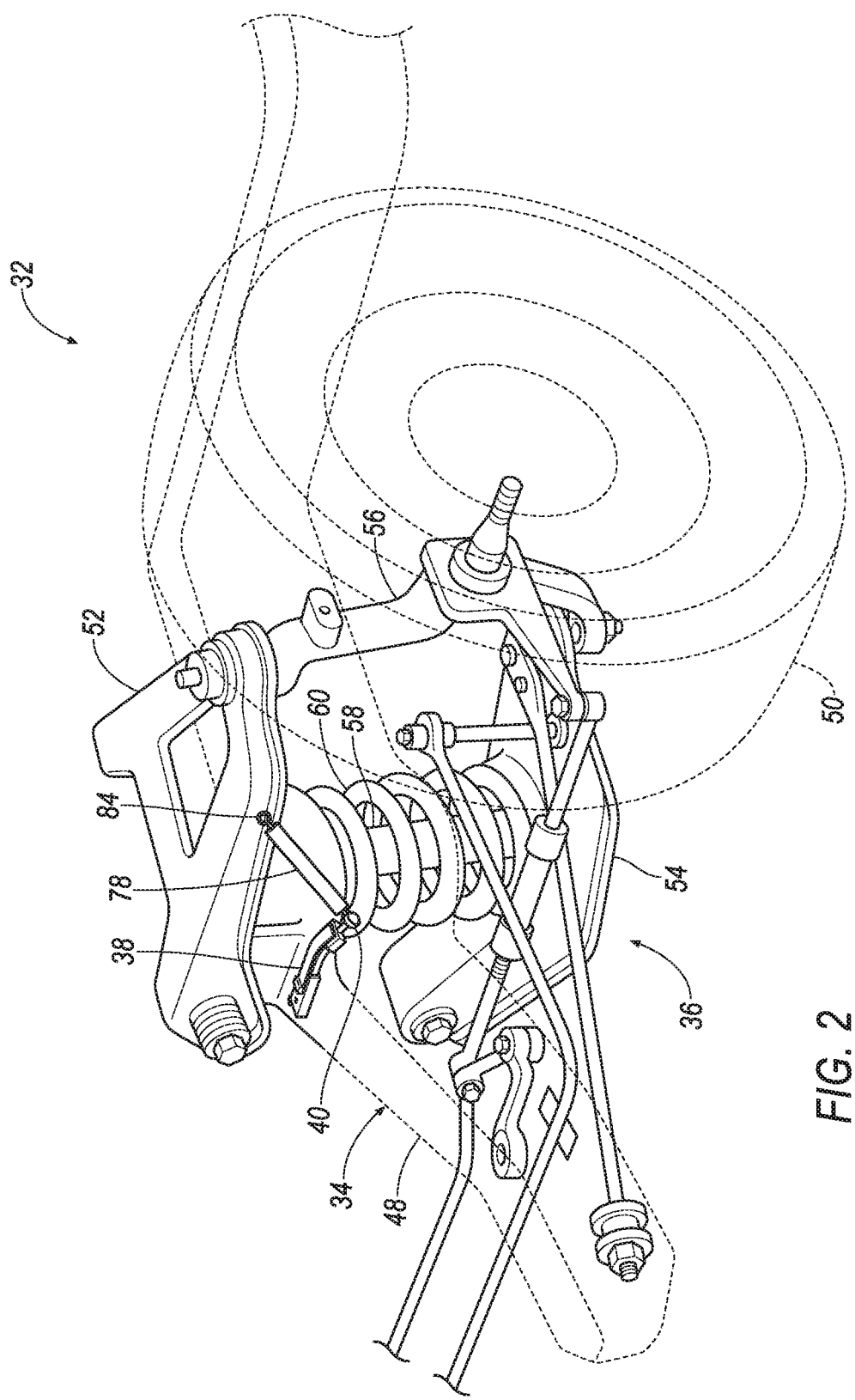
FIG. 2 is a perspective view of a portion of a suspension system of the vehicle.

With reference to FIG. 2, the vehicle frame 46 includes two rails 48. The rails 48 are elongated longitudinally along the vehicle 30 on the left and right sides, respectively. One of the rails 48 may serve as the vehicle frame component 34 to which the flexible sensor 38 is fixed or coupled.

The suspension system 32 couples wheels 50 to the vehicle frame 46 while allowing motion of the wheels 50 relative to the vehicle frame 46 while absorbing and dampening shocks and vibrations from the wheels 50 to the vehicle frame 46. The suspension system 32 can be a double-wishbone suspension, as shown in FIG. 2. The suspension system 32 can include an upper control arm 52, a lower control arm 54, a steering knuckle 56, a shock absorber 58, a coil spring 60, and the wheel 50, any of which can be the suspension component 36 to which the flexible sensor 38 is coupled or fixed. The suspension system 32 may be another type besides double-wishbone, e.g., dependent suspension systems such as Panhard rod or leaf springs, or independent suspension systems such as MacPherson strut or multilink suspension.

The upper and lower control arms 52, 54 are each coupled to and movable relative to the vehicle frame 46, e.g., one of the rails 48. For example, the upper and lower control arms 52, 54 may each have a "V" shape with two extensions hingedly coupled to one of the rails 48 and the extensions meeting at a connection to the steering knuckle 56. The upper and lower control arms 52, 54 are each rotatable in one degree of freedom relative to the vehicle frame 46, e.g., rotatable generally vertically around axes extending generally longitudinally relative to the vehicle 30.

The steering knuckle 56 is rotatably coupled to the upper and lower control arms 52, 54, e.g., with ball joints. The steering knuckle 56 can be rotatable as the upper and lower control arms 52, 54 move up and down, so the rail 48, the upper and lower control arms 52, 54, and the steering knuckle 56 form a four-bar linkage. The steering knuckle 56 can also be rotatable about a generally vertical axis for turning the wheel 50. The wheel 50 is rotatably attached to the steering knuckle 56 so that the wheel 50 can roll relative to the steering knuckle 56.

The shock absorber 58 and coil spring 60 are coupled to the vehicle frame 46 and to the suspension component 36. The shock absorber 58 and the coil spring 60 can extend from one end fixed to the vehicle frame 46, e.g., the rail 48, to another end fixed to one of the other suspension components 36, e.g., the lower control arm 54 as shown in FIG. 2. The length x between the two ends varies as the suspension system 32 moves up and down. The force exerted by the coil spring 60 can be a linear function of the length x, i.e., $F_{spring}=kx$, in which k is a spring coefficient. The force exerted by the shock absorber 58 can be a linear function of a rate of change of the length x, i.e., $F_{shock}=c\dot{x}$, in which c is a damping coefficient. The shock absorber 58 can be an active shock absorber that is part of an active suspension 62; for example, the shock absorber 58 can be communicatively coupled to a controller 64, which can instruct the shock absorber 58 to vary the damping coefficient c.

Figure 3:
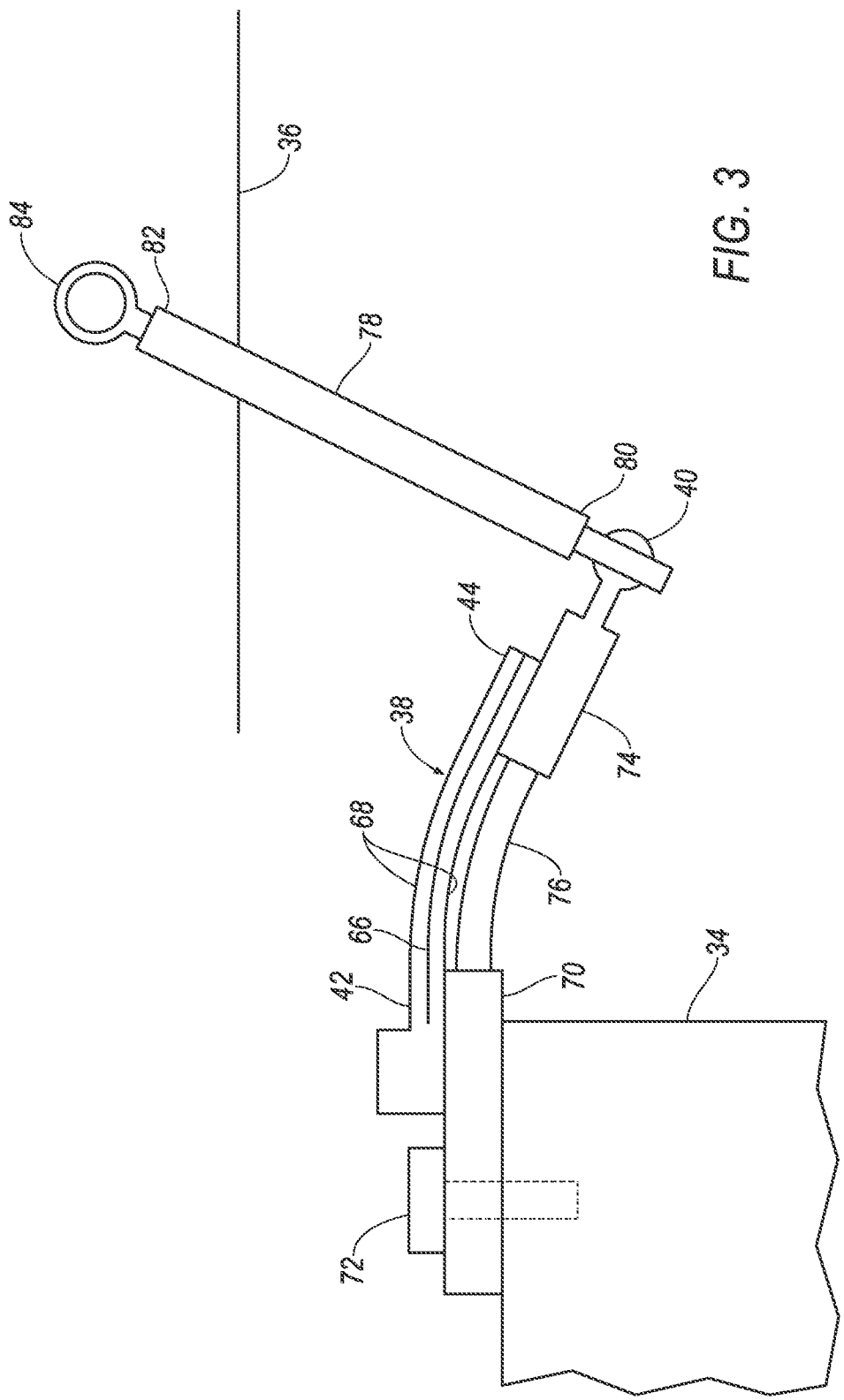
FIG. 3 is a perspective view of a flexible sensor attached to the suspension system.

With reference to FIG. 3, the flexible sensor 38 provides output indicating a bending moment being experienced by the flexible sensor 38. The flexible sensor 38 is flexible in that the flexible sensor 38 can experience a high degree of elastic deformation. A bending moment is a reaction induced in a body when an external force or moment is applied to the body causing the body to bend, i.e., $M=r \times F$, in which M is the bending moment vector at a point in a body, F is a force vector applied to the body, and r is a position vector from where the force is applied to the point. Bending moments have units of force times distance, e.g., Newton-meters.

The flexible sensor 38 can be a potentiometer, with electrical potential across the potentiometer being proportional to the bending moment (i.e., to a magnitude of the bending moment vector M). The flexible sensor 38 can include one or more layers 66 of conductive ink sandwiched between flexible substrates 68, and the layers 66 can include stress fractures and voids of known characteristics. The stress fractures and voids, and thus the electrical resistance of the layers 66, change predictably with the bending moment of the flexible sensor 38. For example, the flexible sensor 38 can include two layers 66 sandwiching a flexible substrate 68. As the flexible sensor 38 bends, the layer 66 toward the convex side (inside) of the bend of the flexible sensor 38 shortens, causing the electrical resistance $R_1$ of that layer 66 to decrease; at the same time, the layer 66 toward the concave side (outside) of the bend of the flexible sensor 38 lengthens, causing the electrical resistance $R_2$ to increase. The two layers 66 can be arranged in series, a known voltage $V_{in}$ can applied to the flexible sensor 38, and a voltage $V_{out}$ can be measured between the two layers 66, thus forming one arrangement of a potentiometer. The voltage $V_{out}$ indicates the bending moment of the flexible sensor 38, as determined by the changes to the electrical resistances $R_1$, $R_2$ in response to bending, i.e., as shown in this equation:

$$V_{out} = \frac{R_2}{R_1 + R_2} V_{in}$$

By using a ratio of the electrical resistances $R_1$, $R_2$, the effects of temperature, tolerance, and aging are reduced.

The flexible sensor 38 is elongated between the first end 42 and the second end 44. As shown in FIGS. 2 and 3, the first end 42 of the flexible sensor 38 is fixed relative to the vehicle frame component 34, specifically, the rail 48, and the second end 44 of the flexible sensor 38 is coupled via the first rotatable joint 40 to the suspension component 36, e.g., the upper control arm 52. Note that this arrangement, including as further described below, can be reversed, i.e., the first end 42 can be fixed relative to the suspension component 36, and the second end 44 can be coupled via the first rotatable joint 40 to the vehicle frame component 34.

The first end 42 of the flexible sensor 38 is fixed relative to one of the vehicle frame components 34, e.g., the rail 48, as shown in FIG. 2. The first end 42 of the flexible sensor 38 has a fixed position and orientation relative to the component to vehicle frame component 34. For example, the first end 42 is fixedly adhered to a first endcap 70, and the first endcap 70 is bolted with a bolt 72 to vehicle frame component 34 such that the first endcap 70 cannot move or rotate relative to the vehicle frame component 34. The first endcap 70 can be rigid, i.e., resists elastic deformation.

The first rotatable joint 40 couples the second end 44 of the flexible sensor 38 to the suspension component 36, e.g., the upper control arm 52, as shown in FIG. 2. The first rotatable joint 40 is attached at the second end 44 of the flexible sensor 38. For example, the second end 44 is fixedly adhered to a second endcap 74, and first rotatable joint 40 is fixed to the second endcap 74. The second endcap 74 can be rigid. A flexible rod 76 is elongated parallel to the flexible sensor 38 from the first endcap 70 to the second endcap 74, and the flexible rod 76 bends with the flexible sensor 38, providing support for the flexible sensor 38. The first rotatable joint 40 has at least one rotational degree of freedom; e.g., the first rotatable joint 40 is a ball joint with three rotational degrees of freedom. At least because of the rotational degree(s) of freedom of the first rotatable joint 40, the second end 44 of the flexible sensor 38 is rotatable relative to the suspension component 36.

The second end 44 of the flexible sensor 38 is coupled to the suspension component 36 via a link arm 78. The link arm 78 is elongated between a first end 80 and a second end 82. The link arm 78 has a fixed length and is rigid. The first end 80 of the link arm 78 is attached at the first rotatable joint 40, and the second end 82 is coupled to the suspension component 36 with a second rotatable joint 84. The second rotatable joint 84 is attached at the second end 82 of the link arm 78 and at the suspension component 36. The second rotatable joint 84 has at least one rotational degree of freedom; e.g., the second rotatable joint 84 is a ball joint with three rotational degrees of freedom.

Figure 4:
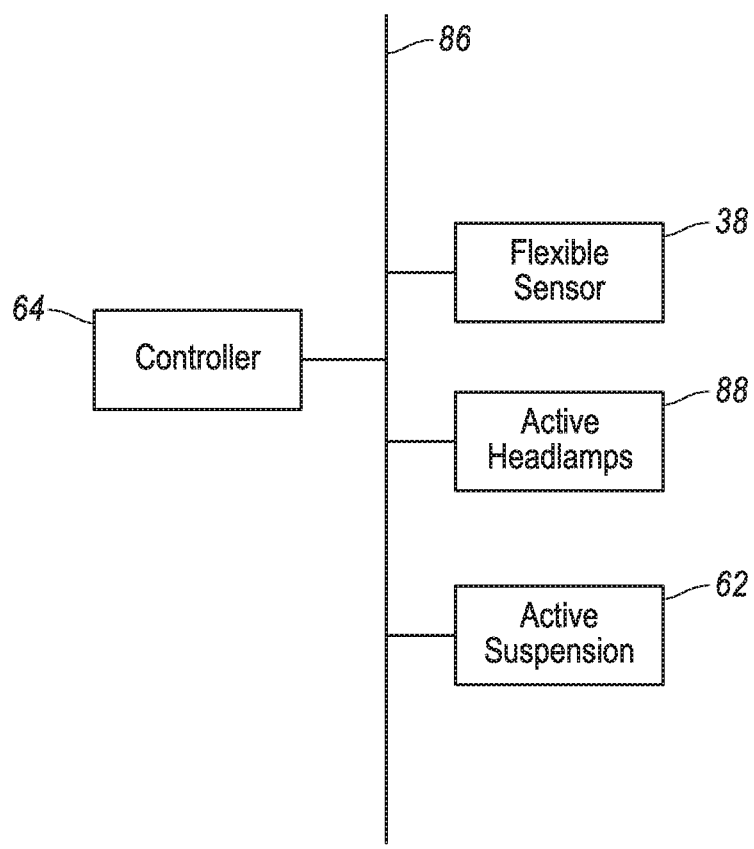
FIG. 4 is a block diagram of a control system including the flexible sensor.

With reference to FIG. 4, the controller 64 is a microprocessor-based controller. The controller 64 includes a processor, a memory, etc. The memory of the controller 64 includes media for storing instructions executable by the processor as well as for electronically storing data and/or databases.

The controller 64 may transmit and receive data through a communications network 86 such as a controller area network (CAN) bus, Ethernet, WiFi, Local Interconnect Network (LIN), onboard diagnostics connector (OBD-II), and/or by any other wired or wireless communications network. The controller 64 may be communicatively coupled to the flexible sensor 38, active headlamps 88, the active suspension 62, and other components via the communications network 86.

The active headlamps 88 may be fixed relative to the vehicle 30 and disposed at a front of the vehicle 30 facing in a vehicle-forward direction. The active headlamps 88 may be any lighting system suitable for illuminating a roadway in front of the vehicle 30, including tungsten, halogen, high-intensity discharge (HID) such as xenon, light-emitting diode (LED), laser, etc. The active headlamps 88 are capable of rotating relative to the vehicle 30. The active headlamps 88 may rotate away from facing parallel to a longitudinal axis of the vehicle 30 to the left or to the right relative to the longitudinal axis of the vehicle 30, or up or down relative to the longitudinal axis of the vehicle 30.

Figure 5:
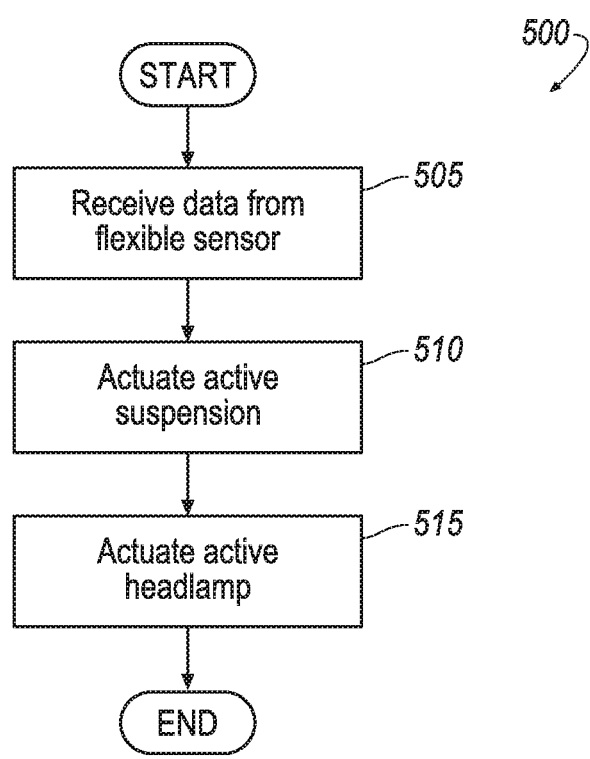
FIG. 5 is a process flow diagram of a process for actuating vehicle components based on data from the flexible sensor.

FIG. 5 is a process flow diagram illustrating an exemplary process 500 for actuating vehicle components based on data from the flexible sensor 38. The memory of the controller 64 stores executable instructions for performing the steps of the process 500. As a general overview of the process 500, the controller 64 receives data from the flexible sensor 38 and actuates the active suspension 62 and the active headlamps 88 based on that data.

The process 500 begins in a block 505, in which the controller 64 receives data from the flexible sensor 38 via the communications network 86. For example, if the flexible sensor 38 is a potentiometer, the data from the flexible sensor 38 is an electrical voltage. The data indicates the bending moment of the flexible sensor 38, and the bending moment of the flexible sensor 38 indicates the vertical position of the wheel 50 relative to the vehicle frame 46. The data can include data from flexible sensors 38 measuring the vertical position of a front wheel 50 and a rear wheel 50, or from flexible sensors 38 measuring the vertical positions of all four wheels 50.

Next, in a block 510, the controller 64 actuates the shock absorber 58 by changing the damping coefficient c of the shock absorber 58 based on the data from the flexible sensor 38. For example, the controller 64 can select a damping coefficient c based on the amplitude or frequency of the data from the flexible sensor 38. The memory of the controller 64 can store, e.g., a lookup table with damping coefficients corresponding to ranges of amplitudes and/or frequencies of the data from the flexible sensor 38. The values in the lookup table can be selected by measuring occupant ride quality and handling of the vehicle 30 with different damping coefficients over road types producing different amplitudes and frequencies.

Next, in a block 515, the controller 64 actuates the active headlamps 88 based on the data from the flexible sensor 38. For example, the controller 64 may use the data from the flexible sensor 38 coupled to the front wheel 50 and the flexible sensor 38 coupled to the rear wheel 50 to determine a pitch of the vehicle 30 relative to a roadway over which the vehicle 30 is traveling. The controller 64 can instruct the active headlamps 88 to actuate up or down to compensate for the relative pitch of the vehicle 30, i.e., actuating the headlamps up if the vehicle 30 is angled downward, and actuating the headlamps down if the vehicle 30 is angled upward. After the block 515, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A suspension system comprising:
a vehicle frame component;
a suspension component coupled to and movable relative to the vehicle frame component;
a first endcap;
a second endcap;
a flexible sensor elongated between a first end fixed to the first endcap and a second end fixed to the second endcap, the first endcap fixed relative to one of the vehicle frame component or the suspension component; and
a rotatable joint coupling the second endcap to the other of the vehicle frame component or the suspension component;
the first and second endcaps being rigid.

2. The suspension system of claim 1, wherein the rotatable joint is connected to the flexible sensor at the second end of the flexible sensor, the suspension system further comprising a link arm elongated between a first end and a second end, wherein the first end of the link arm is attached at the rotatable joint, and the second end of the link arm is coupled to the other of the vehicle frame component or the suspension component.

3. The suspension system of claim 2, wherein the rotatable joint is a first rotatable joint, the suspension system further comprising a second rotatable joint attached at the second end of the link arm and at the other of the vehicle frame component or the suspension component.

4. The suspension system of claim 3, wherein the second rotatable joint is a ball joint.

5. The suspension system of claim 1, wherein the rotatable joint is a ball joint.

6. The suspension system of claim 1, wherein the flexible sensor is configured to provide output indicating a bending moment of the flexible sensor.

7. The suspension system of claim 1, wherein the suspension component is rotatable relative to the vehicle frame component.

8. The suspension system of claim 1, wherein the suspension component is one of an upper control arm or a lower control arm.

9. The suspension system of claim 1, wherein the first end of the flexible sensor has a fixed position and orientation relative to the one of the vehicle frame component or the suspension component.

10. The suspension system of claim 1, wherein the second end of the flexible sensor is rotatable relative to the other of the vehicle frame component or the suspension component.

11. The suspension system of claim 1, wherein the flexible sensor is a potentiometer.

12. The suspension system of claim 1, wherein the flexible sensor includes a layer of conductive ink.

13. The suspension system of claim 1, further comprising a shock absorber coupled to the vehicle frame component and to the suspension component.

14. The suspension system of claim 1, further comprising a controller communicatively coupled to the flexible sensor and programmed to actuate a vehicle component based on data received from the flexible sensor.

15. The suspension system of claim 14, wherein the vehicle component is an active headlamp.

16. The suspension system of claim 14, wherein the vehicle component is an active shock absorber coupled to the vehicle frame component and to the suspension component.

17. The suspension system of claim 1, further comprising a flexible rod elongated parallel to the flexible sensor from the first endcap to the second endcap.

18. The suspension system of claim 17, wherein the flexible sensor is spaced from the flexible rod.

* * * * *